US005739710A

United States Patent [19]

Baik

[11] Patent Number: 5,739,710

[45] Date of Patent: Apr. 14, 1998

[54] DYNAMIC/STATIC SIGNAL CONVERTING CIRCUIT AND METHOD FOR USE IN A LAMP DRIVING DEVICE

[75] Inventor: Seung-Gil Baik, Daegu, Rep. of Korea

[73] Assignee: SamSung Electronics Co., Ltd., Suwon, Rep. of Korea

[21] Appl. No.: 679,433

[22] Filed: Jul. 8, 1996

[30] Foreign Application Priority Data

Jul. 8, 1995 [KR] Rep. of Korea .................. 1995-20112

[51] Int. Cl.$^6$ ...................................................... H04B 10/04

[52] U.S. Cl. ........................... 327/173; 327/174; 327/108

[58] Field of Search ........................... 327/172, 173–176, 327/270, 276, 277, 108; 359/139, 140, 180

[56] References Cited

U.S. PATENT DOCUMENTS

| | | | |
|---|---|---|---|
| 3,976,893 | 8/1976 | Banfi | 327/392 |
| 4,684,934 | 8/1987 | Small | 340/712 |
| 4,912,524 | 3/1990 | Nakamura et al. | 327/173 |
| 4,955,081 | 9/1990 | Takahashi | 327/173 |
| 5,243,456 | 9/1993 | Hirakata | 327/176 |
| 5,294,848 | 3/1994 | Kannegundia | 327/263 |
| 5,309,034 | 5/1994 | Ishibashi | 307/267 |
| 5,422,585 | 6/1995 | Chiangi et al. | 327/170 |
| 5,486,785 | 1/1996 | Lee | 327/378 |

FOREIGN PATENT DOCUMENTS

| | | | |
|---|---|---|---|
| 62-247618 | 10/1987 | Japan | 327/263 |
| 3-121612 | 5/1991 | Japan | 327/176 |

*Primary Examiner*—Timothy P. Callahan
*Assistant Examiner*—T. T. Lam
*Attorney, Agent, or Firm*—Robert E. Bushnell, Esq.

[57] ABSTRACT

A dynamic/static signal converting circuit and method for use in a lamp driving device has a clock delay unit for delaying a system clock signal for a predetermined period of time; a converting unit for receiving a dynamic signal for driving an LED, synchronizing the dynamic signal with a delayed system clock signal and then converting the dynamic signal into a static signal; and an LED driving unit for driving the LED in response to the static signal output from the converting unit.

2 Claims, 2 Drawing Sheets

DYNAMIC/STATIC SIGNAL CONVERTING CIRCUIT AND METHOD FOR USE IN A LAMP DRIVING DEVICE

CROSS REFERENCE TO RELATED APPLICATIONS

This application make reference to, incorporates the same herein, and claims all benefits accruing under 35 U.S.C §119 from an application entitled DYNAMIC/STATIC SIGNAL CONVERTING CIRCUIT FOR USE IN LAMP DRIVING DEVICE AND A METHOD THEREOF earlier filed in the Korean Industrial Property Office on 8 Jul. 1995 and assigned Serial No. 20112/1995.

BACKGROUND OF THE INVENTION

1. Field of the Invention

The present invention relates to a circuit and method for converting a dynamic signal for driving a lamp into a static signal in a lamp driving device.

2. Description of the Related Art

Generally, systems like a keyphone where an operating state is displayed by using a plurality of light emitting diodes (LEDs), are constructed in a matrix form, and the output of the matrix is a dynamic signal. In the case of driving the LED spaced from a lens by using the dynamic signal, there occurs a problem of the darkness of the LED and of flickering of the LED due to the short on time of the LED.

U.S. Pat. No. 4,684,934 to Small is but one example of an LED matrix driven by a dynamic signal.

While the concept of replacing an input pulse with a "stretched" pulse generated by delaying the input pulse and then "ORing" the input pulse with the delayed input pulse is not new, see for example, U.S. Pat. No. 5,309,034 to Ishibashi, nevertheless, the concept does not appear to have been applied to the driving of LED devices.

SUMMARY OF THE INVENTION

It is therefore an object of the present invention to provide a circuit and method for converting a dynamic signal into a static signal for a stable operation of an LED used for displaying an operating state in a keyphone system.

It is another object of the present invention to provide a circuit and method for converting a dynamic signal for driving an LED into a static signal.

To achieve the above objects, a circuit of the present invention has a clock delay unit for delaying a system clock signal for a predetermined period of time; a converting unit for receiving a dynamic signal for driving an LED, synchronizing the dynamic signal with a delayed system clock signal and then converting the dynamic signal into a static signal; and an LED driving unit for driving the LED in response to the static signal output from the converting unit.

To achieve the above objects, a method of the present invention has the steps of delaying a system clock signal for a predetermined period of time; and synchronizing a dynamic signal for driving the LED with a delayed system clock signal and then converting the dynamic signal into a static signal.

BRIEF DESCRIPTION OF THE DRAWINGS

These and various other features and advantages of the present invention will be readily understood with reference to the following detailed description taken in conjunction with the accompanying drawings, in which.

DETAILED DESCRIPTION OF THE PREFERRED EMBODIMENT

Figure 1:
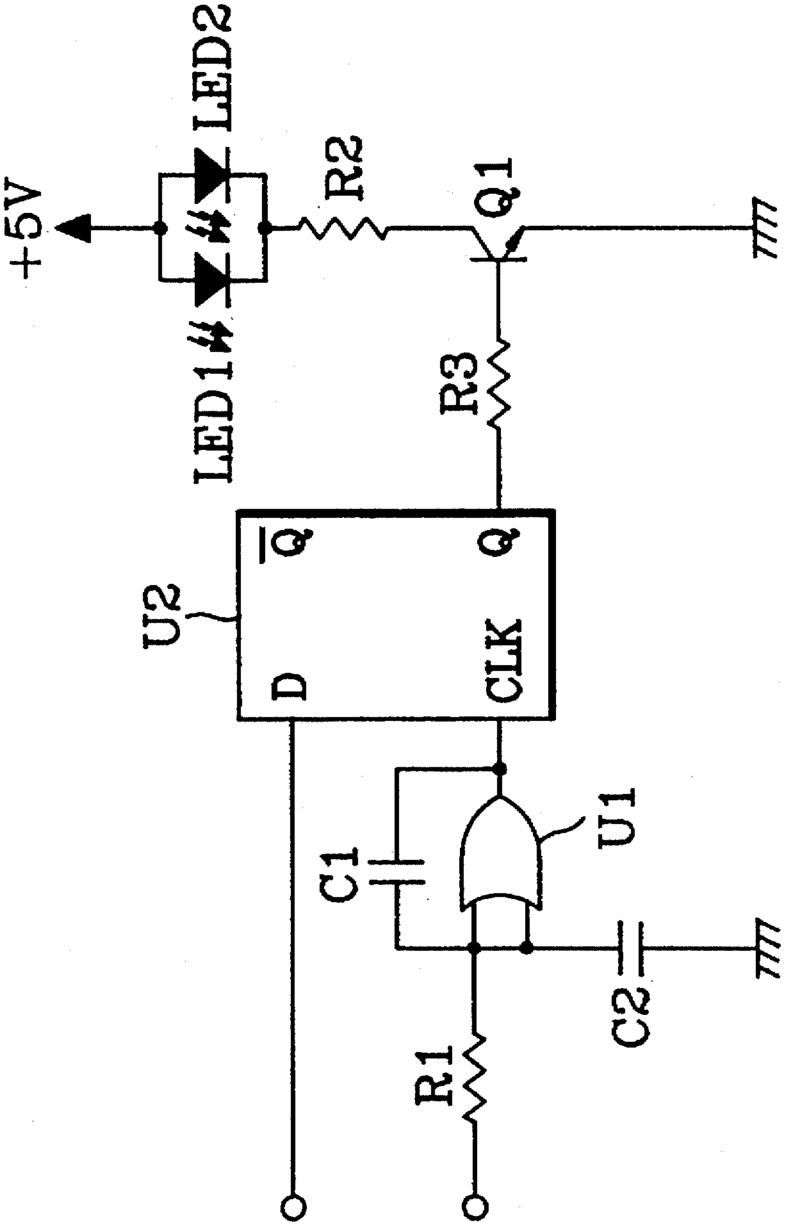
FIG. 1 is a circuit diagram showing a dynamic/static signal converting circuit according to the present invention.

FIG. 1 is a circuit diagram showing a dynamic/static signal converting circuit according to the present invention. In the figure, the circuit has a clock delay unit for delaying a system clock signal for a predetermined period of time; a converting unit for synchronizing a dynamic signal for driving an LED with the delayed clock signal and then converting the dynamic signal into a static signal; and an LED driving unit for driving the LED 1 and LED 2 in response to the static signal.

The clock delay unit is composed of a time delay part which has a resistor R1 and a capacitor C2 and delays the system clock signal for a predetermined period of time, and a signal shaping part consisting of capacitor C1 and logic gate U1 for shaping the delayed clock signal into an accurate logic signal.

Figures 2A, 2B, 2C, 2D:
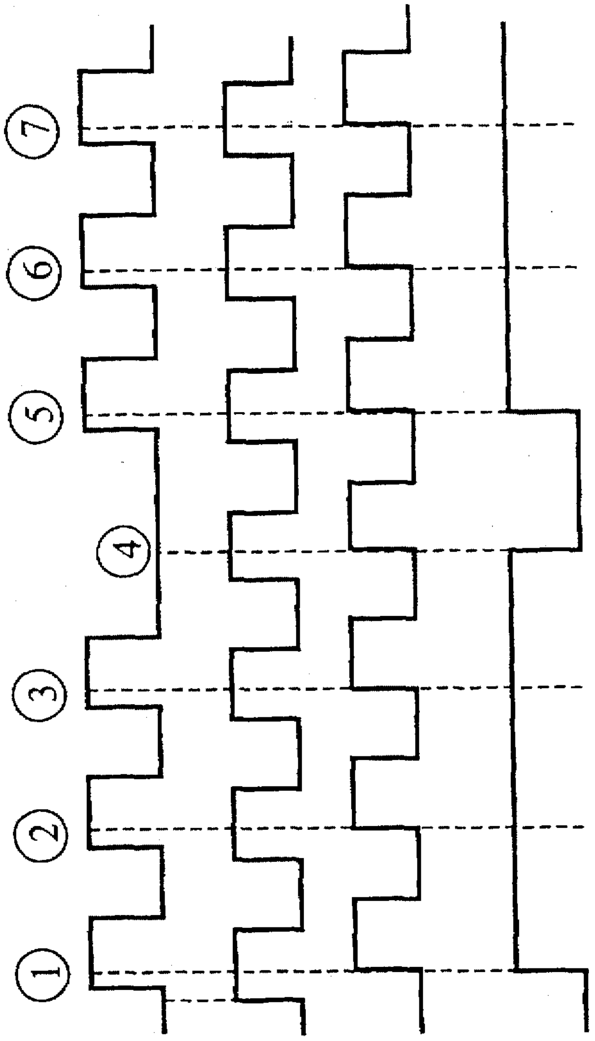
FIGS. 2(A)–2(D) is a waveform chart showing the operation of each part in FIG. 1.

FIG. 2 is a waveform chart showing operation of each part in FIG. 1. In the figure, 2A is a waveform of a dynamic signal for driving the LED which is input to a data terminal D of a D flip-flop U2, 2B is a waveform of a system clock signal, 2C is a waveform of the system clock signal which has been delayed for a predetermined time by the clock delay unit, and 2D is a waveform of a static signal output from the D flip-flop U2.

A preferred embodiment of the present invention will now be described in detail with reference to FIGS. 1 and 2.

A dynamic signal for driving the LED is generated from a central processing unit (not shown), shown as 2A of FIG. 2, and the CPU generates a system clock signal shown as 2B of FIG. 2. The system clock signal is delayed by a resistor R1 and a capacitor C2 for a predetermined period of time $\tau$ which is obtained by a following equation <1>.

$$\tau=R*C \qquad \text{<1>}$$

If the dynamic signal output from the CPU is later than or equal to the system clock signal, the system clock signal is delayed so as to adjust the set-up time. The logic gate U1 and capacitor C1 shape the system clock signal which has been delayed through the resistor R1 and capacitor C2 so as to maintain a correct logic state. That is, the capacitor C1 compensates the delayed clock signal so that the delayed clock signal does not cause chatter at a rising edge or at a falling edge through the logic gate U1.

The dynamic signal shown as 2A of FIG. 2 output from the CPU is supplied to a data terminal D of the flip-flop U2, and the delayed system clock signal shown as 2C of FIG. 2 is applied to the clock terminal CLK of the flip-flop U2. The flip-flop U2 outputs the static signal shown as 2D of FIG. 2 at the rising edge of the system clock signal shown as 2C of FIG. 2 through an output terminal Q. The static signal output from the output terminal Q is supplied to a base of a transistor Q1 through a resistor R3. The transistor Q1 is turned on when the static signal is at a logic high state, thereby making the LED 1 and LED 2 emit light.

As described above, the present invention can solve the problem that it is difficult to distinguish the display state due to the flickering or darkness of the LED, by converting the dynamic signal for driving the LED into the static signal, thereby making it possible to display a correct operating state.

While there has been illustrated and described what is considered to be preferred embodiment of the present invention, it will be understood by those skilled in the art that various changes and modifications may be made without departing from the scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. A signal converting circuit comprising:

a D type flip-flop having a D input terminal and a clock input terminal and an output terminal, said D input terminal being connected to an input signal;

a clock delay means for delaying an inputted system clock signal for a predetermined period of time, said clock delay means comprising a first resistor for receiving the inputted system clock signal;

a first capacitor connected between said first resistor and ground;

a logic gate having at least one input connected to a junction of said first resistor and said first capacitor and having an output connected to said clock terminal of said D flip-flop and a second capacitor connected between said input and output terminals of said logic gate; and a driving means connected to said D flip-flop output terminal for driving at least one light emitting diode.

2. The converting circuit of claim 1, said driving means comprising:

a second resistor connected to said output of said D flip-flop;

a transistor having a base, emitter and collector, said base being connected to said second resistor, said emitter being connect to ground and said collector being connected to a third resistor; and at least one light emitting diode being connected between a source of voltage and said third resistor.

* * * * *